United States Patent
Ishijima et al.

(10) Patent No.: US 10,642,137 B2
(45) Date of Patent: May 5, 2020

(54) PROJECTION-TYPE IMAGE DISPLAY DEVICE

(71) Applicant: MAXELL, LTD., Kyoto (JP)

(72) Inventors: Eiki Ishijima, Hitachi (JP); Shinro Inui, Oyamazaki (JP); Hiroshi Oshima, Hitachi (JP); Nobuki Matsui, Hitachi (JP)

(73) Assignee: MAXELL, LTD., Kyoto (JP)

( * ) Notice: Subject to any disclaimer, the term of this patent is extended or adjusted under 35 U.S.C. 154(b) by 49 days.

(21) Appl. No.: 15/571,620

(22) PCT Filed: May 19, 2015

(86) PCT No.: PCT/JP2015/064245
§ 371 (c)(1),
(2) Date: Nov. 3, 2017

(87) PCT Pub. No.: WO2016/185550
PCT Pub. Date: Nov. 24, 2016

(65) Prior Publication Data
US 2018/0143520 A1    May 24, 2018

(51) Int. Cl.
*G03B 21/20* (2006.01)
*G03B 21/14* (2006.01)
*G02B 27/09* (2006.01)

(52) U.S. Cl.
CPC ..... *G03B 21/2033* (2013.01); *G02B 27/0955* (2013.01); *G03B 21/14* (2013.01)

(58) Field of Classification Search
CPC . G03B 21/2033; G03B 21/14; G02B 27/0955
(Continued)

(56) References Cited

U.S. PATENT DOCUMENTS

| 2,871,565 A * | 2/1959 | Barth | F41G 3/24 33/230 |
| 2002/0154278 A1* | 10/2002 | Masuda | G02B 7/02 353/101 |

(Continued)

FOREIGN PATENT DOCUMENTS

| JP | 04-180008 A | 6/1992 |
| JP | 2005-062852 A | 3/2005 |
| WO | 2013/054426 A1 | 4/2013 |

OTHER PUBLICATIONS

International Search Report of PCT/JP2015/064245 dated Aug. 4, 2015.

*Primary Examiner* — Brian P Yenke
*Assistant Examiner* — Sean N. Haiem
(74) *Attorney, Agent, or Firm* — Mattingly & Malur, PC

(57) ABSTRACT

A lens shift mechanism 32 of the projection-type image display device 10 includes a horizontal movable base 60 for horizontally shifting a projection lens 31, a vertical movable base 70 for vertically shifting the projection lens 31, and a horizontal drive actuator 61 and a vertical drive actuator 71 for driving these bases 60, 70. Driving forces of these actuators 61, 71 are transmitted via respective lead screws 671 (751) and a pair of lead nuts 672, 672b (752, 752b) meshing with the lead screws to shift the bases 60, 70. A pair of lead nuts are installed with elastic bodies 672c (752c) applying a pressure such that the pair of lead nuts recede from or approach each other in the axial direction of the lead screw. In this configuration, a delay in the shift operation is removed by reducing a backlash in the lens movement.

20 Claims, 18 Drawing Sheets

(58) Field of Classification Search
USPC ....... 348/744, 208.11; 396/89; 353/119, 101, 353/33
See application file for complete search history.

(56) References Cited

U.S. PATENT DOCUMENTS

| | | | |
|---|---|---|---|
| 2005/0219719 A1* | 10/2005 | Kawai | G02B 7/08 359/819 |
| 2006/0049720 A1* | 3/2006 | Henderson | G02B 7/102 310/328 |
| 2006/0244933 A1* | 11/2006 | Kuroda | G03B 5/04 353/119 |
| 2007/0086766 A1* | 4/2007 | Nomura | G03B 13/18 396/89 |
| 2007/0109503 A1* | 5/2007 | Lu | H04N 5/7441 353/33 |
| 2011/0181743 A1* | 7/2011 | Ando | G03B 5/02 348/208.11 |
| 2014/0253818 A1* | 9/2014 | Ono | G03B 5/06 348/744 |

\* cited by examiner

F I G. 6
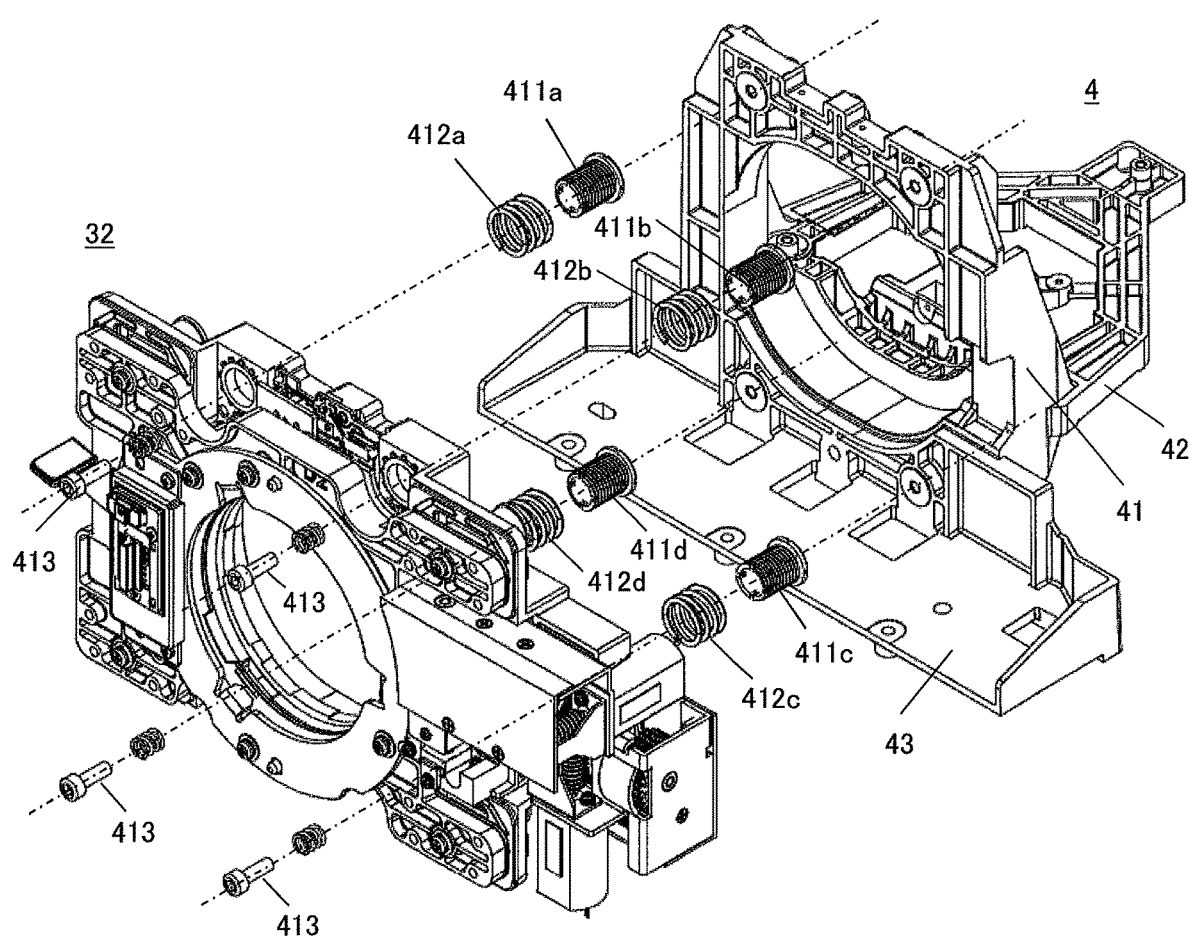

32 . LENS SHIFT MECHANISM

F I G. 1 0
HORIZONTAL DRIVE MECHANISM
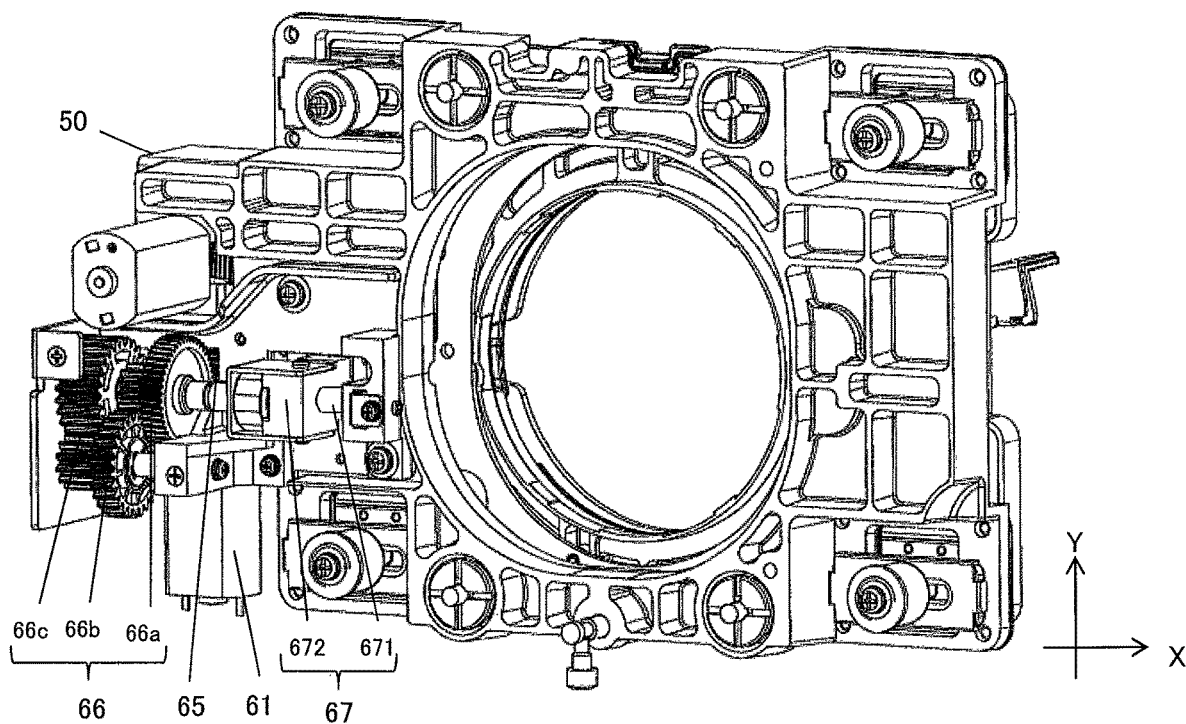

F I G. 1 1
VERTICAL DRIVE MECHANISM
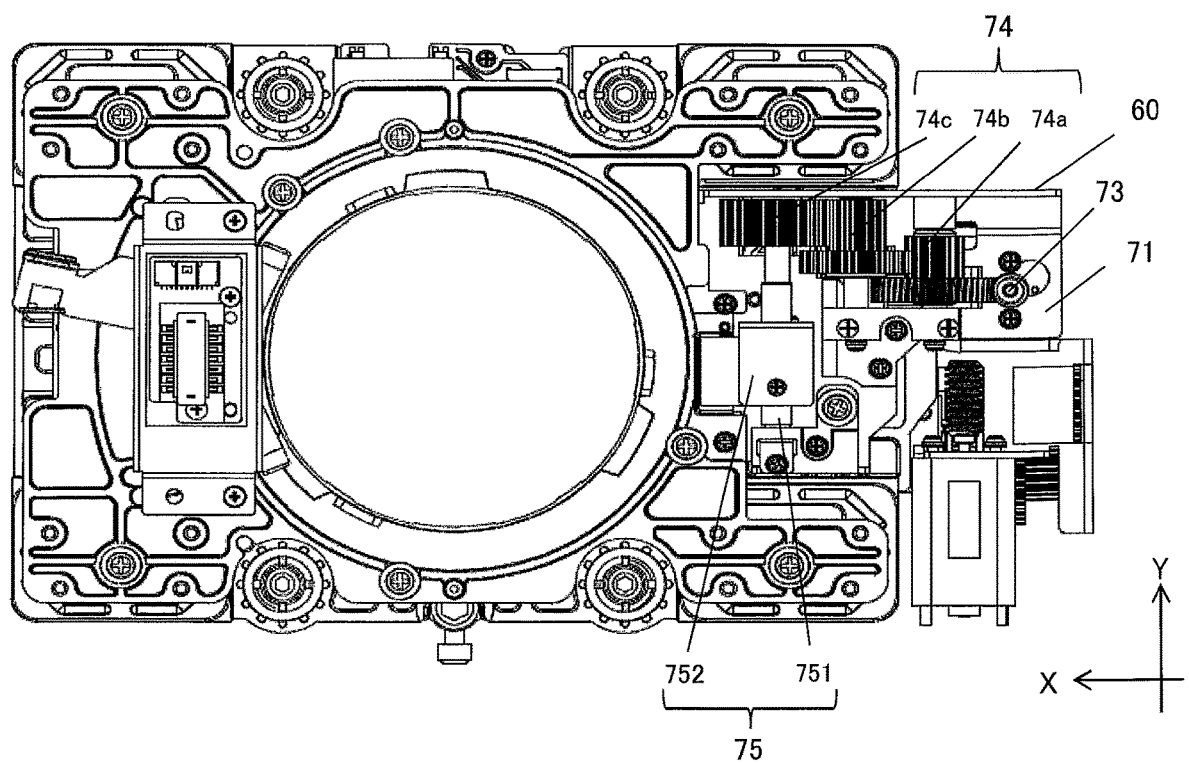

FIG. 12
HORIZONTAL DRIVE LEAD NUT
(a) ASSEMBLED STATE
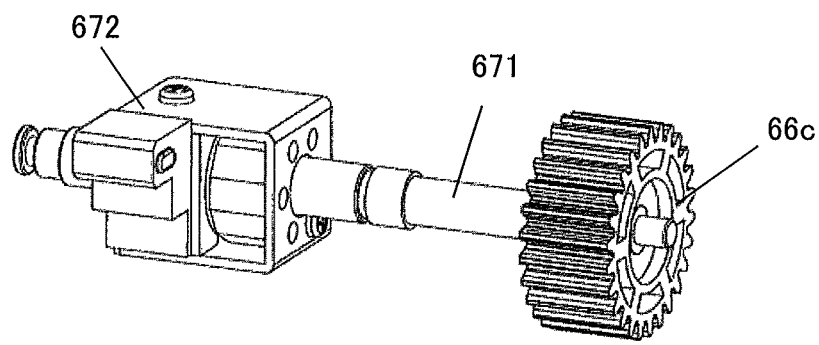
(b) DISASSEMBLED STATE
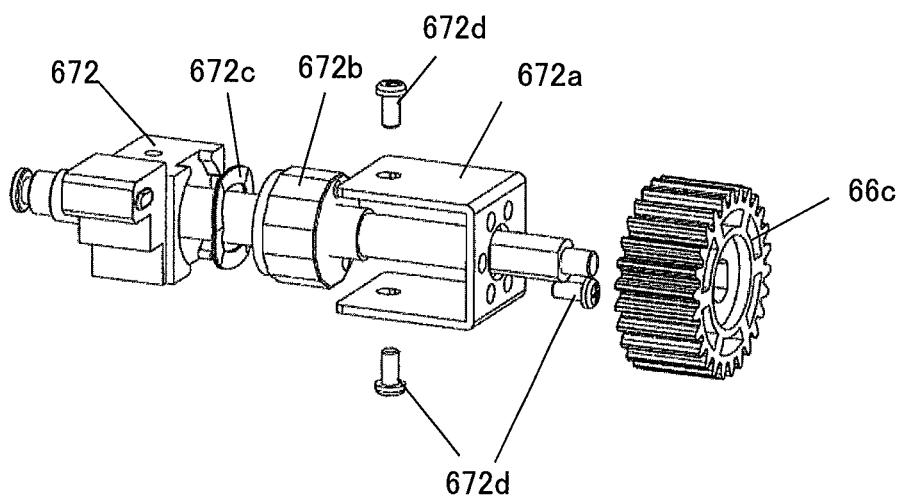

FIG. 13
VERTICAL DRIVE LEAD NUT
(a) ASSEMBLED STATE
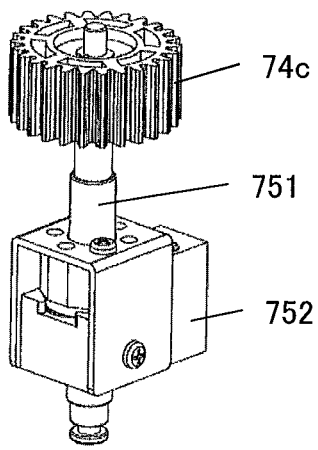
(b) DISASSEMBLED STATE
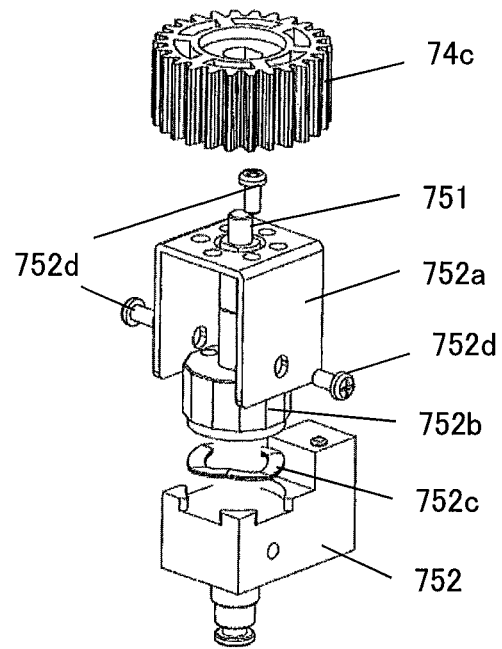

DESCRIPTION OF BACKLASH REDUCTION

ANOTHER CONFIGURATION EXAMPLE OF DOUBLE NUT

FIG. 16
(a) EXAMPLE (1) OF SUBSIDIARY NUT
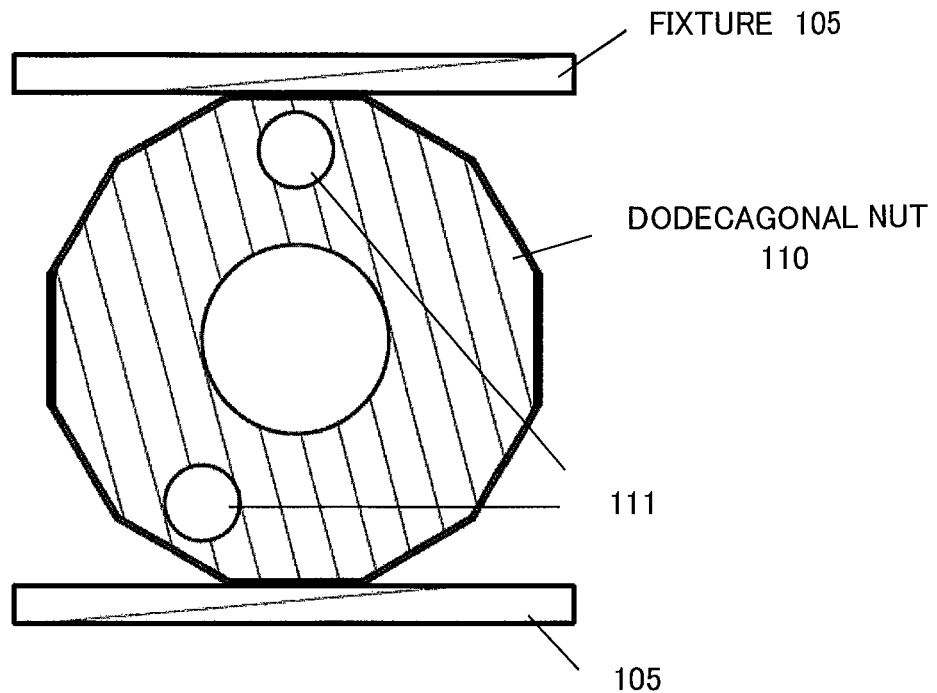
(b) EXAMPLE (2) OF SUBSIDIARY NUT
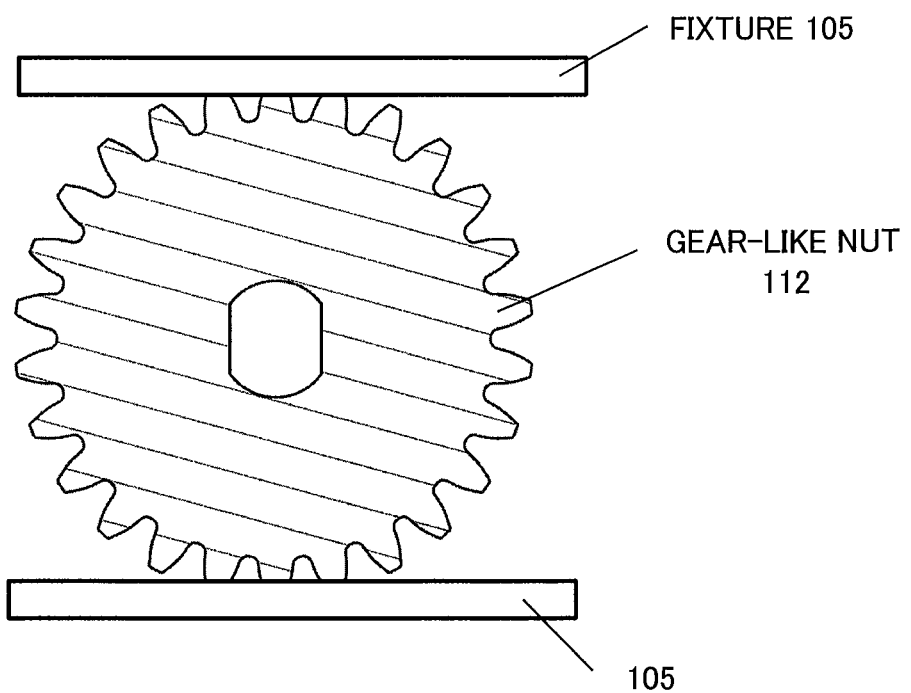

OPTICAL AXIS CORRECTION MECHANISM OF PROJECTION LENS

FIG. 18
(a) BEFORE OPTICAL AXIS CORRECTION
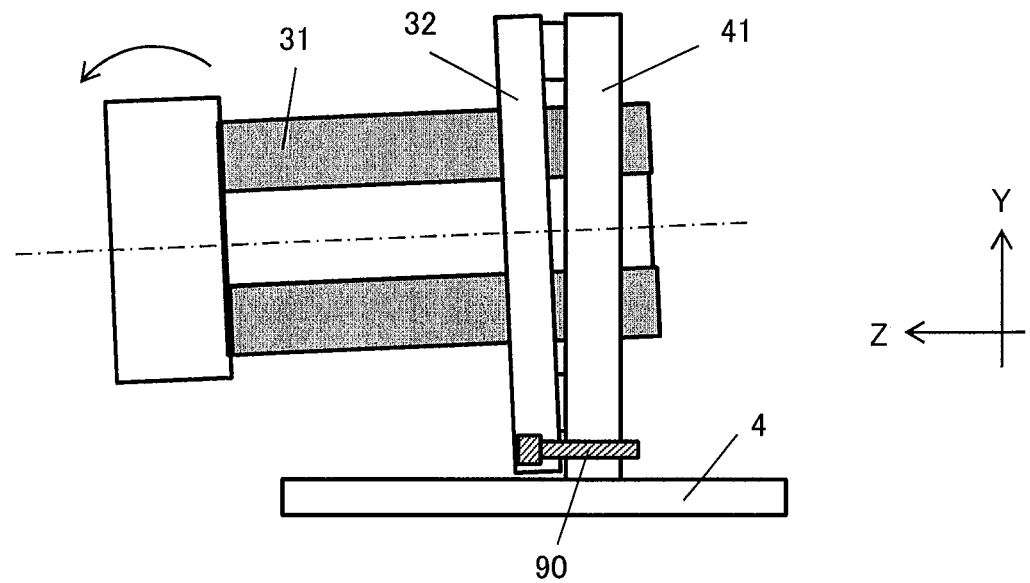
(b) AFTER OPTICAL AXIS CORRECTION
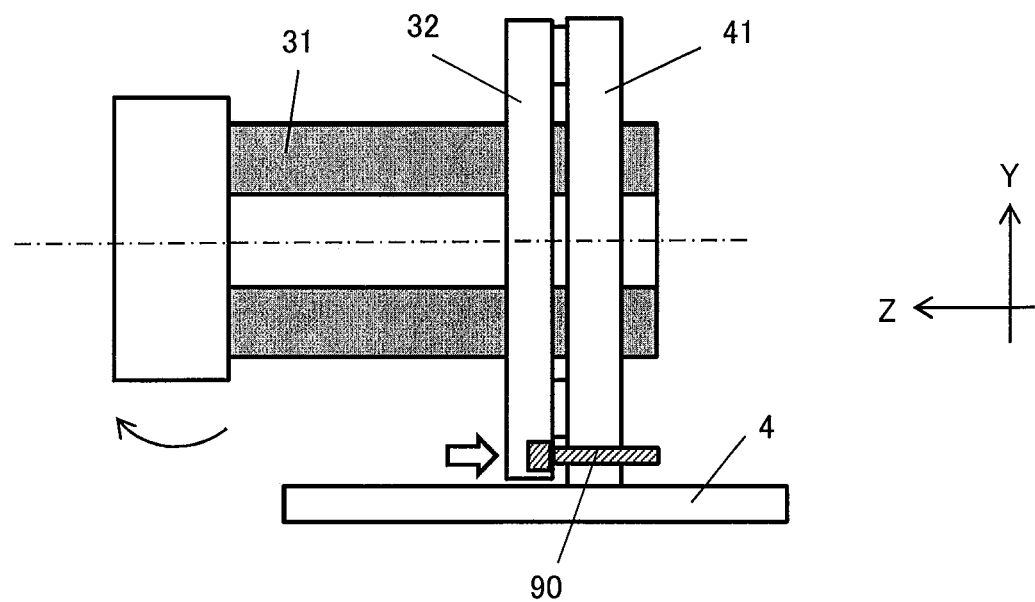

PROJECTION-TYPE IMAGE DISPLAY DEVICE

TECHNICAL FIELD

The present invention relates to a projection-type image display device, and more particularly, to a lens shift mechanism for shifting a projection lens.

BACKGROUND ART

A projection-type image display device such as a liquid crystal projector irradiates light emitted from a light source such as a mercury lamp onto a display element such as a liquid crystal panel and magnifies and projects the image formed on the display element from a projection lens to a screen or the like. An optical system of the device includes an optical unit (hereinafter, referred to as an optical engine) used to form an image by irradiating light emitted from a light source onto a liquid crystal panel and a projection optical system that magnifies and projects the image formed on the liquid crystal panel using the projection lens.

The projection optical system is provided with a lens shift mechanism for shifting the projection lens perpendicularly to an optical axis in order to adjust an image display position on the screen. The lens shift mechanism shifts the projection lens in two directions perpendicular to the optical axis of the projection light, that is, horizontal and vertical directions, so that improved operability is necessary. Patent Document 1 proposes a mechanism capable of allowing a user to easily recognize a shift direction of the projection optical system by aligning a shift direction and an operation knob direction of the projection optical system in order to improve operability.

CITATION LIST

Patent Document

Patent Document 1: JP 2005-62852 A

SUMMARY OF THE INVENTION

Problems to be Solved by the Invention

A general lens shift mechanism has an X-slider (X-base) for horizontally shifting the projection lens, a drive mechanism for the X-slider, a Y-slider (Y-base) for vertically shifting the operation lens, and a drive mechanism for the Y-slider. In the lens shift mechanism described in Patent Document 1 or the like, each drive mechanism has a drive force transmission component such as a cam or gear. However, there is a gap called a backlash in the connecting portion of the drive force transmission components in order to facilitate a shift operation of each slider. Meanwhile, when the shift direction of the projection lens is reversed from the left to the right or from the upside to the downside, the X-slider or the Y-slider does not move until the gap of the backlash is removed. This delays the shift operation and degrades operability disadvantageously.

In addition, the lens shift mechanism has a capability of correcting an optical axis tilt of the projection lens or the like. In the related art, the tilt is corrected by adjusting a plurality of adjustment screws. However, if a heavy lens is installed in the replacement of the projection lens, an optical axis of the lens is tilted by a weight of the lens, so that it is necessary to perform correction again. In the method of adjusting a plurality of adjustment screws in the related art, the adjustment becomes complicated disadvantageously.

An object of the present invention is to provide a projection-type image display device having a lens shift mechanism capable of removing a delay in the shift operation by reducing the backlash and facilitating optical axis tilt adjustment.

Solutions to Problems

According to an aspect of the invention, there is provided a projection-type image display device that projects an image from a projection lens, including a lens shift mechanism configured to retain the projection lens and shift the projection lens in two directions perpendicular to an optical axis of projection light, the lens shift mechanism having a horizontal movable base for horizontally shifting the projection lens, a vertical movable base for vertically shifting the projection lens, a horizontal drive actuator for driving the horizontal movable base, and a vertical drive actuator for driving the vertical movable base, in which driving forces of the horizontal drive actuator and the vertical drive actuator are transmitted via respective lead screws and a pair of lead nuts meshing with the lead screws to shift the horizontal movable base and the vertical movable base, and a pressure is applied to the pair of lead nuts using an elastic body such that the pair of lead nuts recede from or approach each other in an axial direction of the lead screw.

In addition, an optical axis adjustment guide is inserted into the common base that holds the lens shift mechanism from the lens shift mechanism side, the optical axis adjustment guide has a concave portion in the vicinity of a tip of a threaded portion, a fixing screw inserted from the common base side is engaged with the concave portion, and an optical axis tilt of the projection lens retained in the lens shift mechanism is corrected by adjusting an insertion amount of the optical axis adjustment guide.

Effects of the Invention

According to the present invention, is possible to provide a projection-type image display device capable of facilitating adjustment of an optical axis tilt of the lens and removing a delay in the lens shift operation with excellent operability.

BRIEF DESCRIPTION OF THE DRAWINGS

FIG. 6 is an exploded view illustrating the lens shift mechanism 32 and the common base 4.

FIG. 10 is a diagram illustrating a horizontal drive mechanism.

FIG. 11 is a diagram illustrating a vertical drive mechanism.

FIG. 12 is a diagram illustrating an internal structure of a horizontal drive lead nut.

FIG. 13 is a diagram illustrating an internal structure of a vertical drive lead nut.

FIG. 16 is a diagram illustrating a specific configuration of a subsidiary nut.

FIG. 18 is a diagram illustrating an example of projection lens optical axis correction.

MODE FOR CARRYING OUT THE INVENTION

Embodiments of the invention will now be described with reference to the accompanying drawings.

First Embodiment

Figure 1:
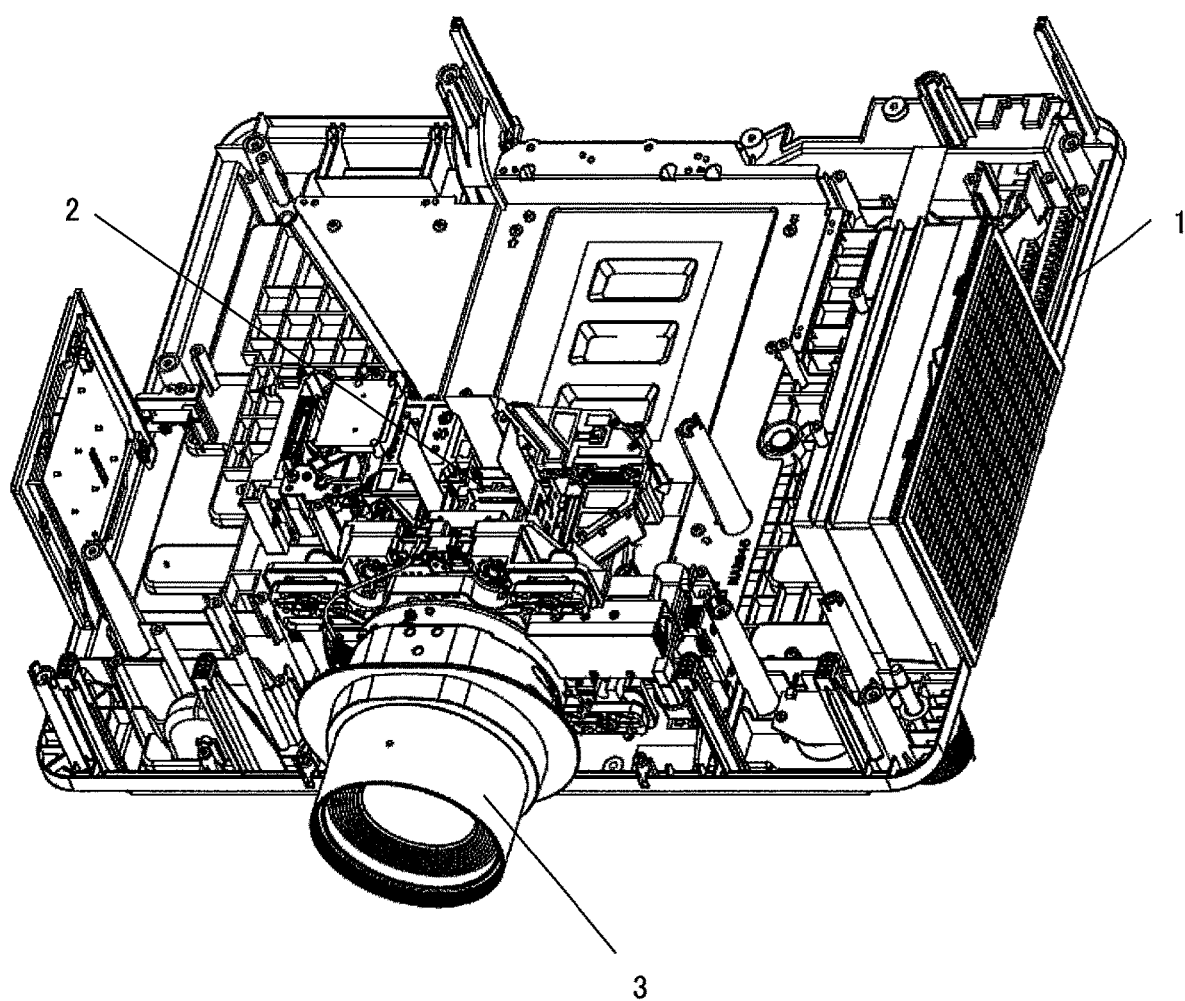
FIG. 1 is a diagram illustrating a whole configuration of a projection-type image display device 10.

FIG. 1 is a diagram illustrating a whole configuration of a projection-type image display device 10 including internal components by excluding a cover of the device. A housing 1 houses optical systems including an optical engine 2 that emits light from a light source and irradiates the light onto a liquid crystal panel as a display element to form an image and a projection optical system 3 that magnifies and projects the image formed on the liquid crystal panel using a projection lens. In addition, the housing 1 houses a power unit, a cooler unit, an image signal circuit, a control circuit, and the like although not illustrated in the drawings.

Figure 2:
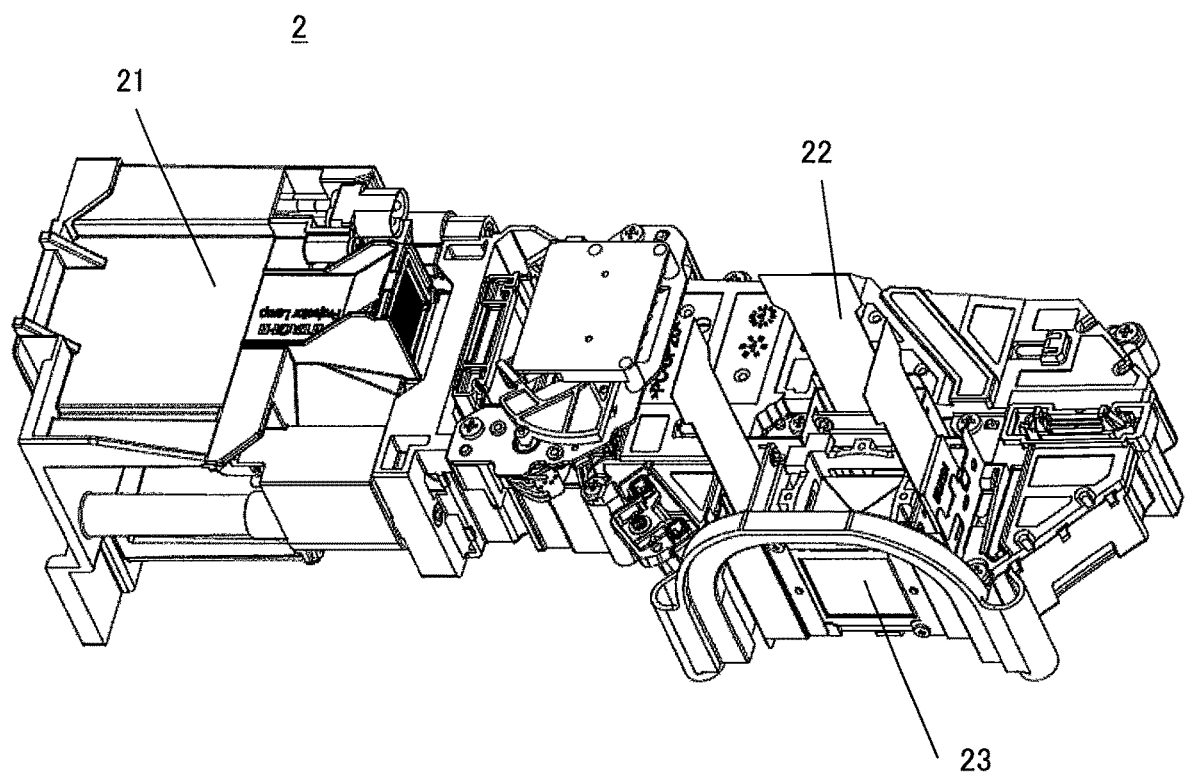
FIG. 2 is a diagram illustrating a whole configuration of an optical engine 2.

FIG. 2 is a diagram illustrating a whole configuration of the optical engine 2. The optical engine 2 includes a light source unit 21, a color separation optical system 22, and a color synthesis optical system 23. The light source unit 21 emits substantially white light using a light source such as an extra-high pressure mercury lamp. The color separation optical system 22 separates the substantially white light into three primary-color light beams and guides them into the corresponding liquid crystal panels. The color synthesis optical system 23 has red, green, and blue (RGB) liquid crystal panels and a cross dichroic prism to form images based on R, G, and B signals and synthesize colors of the images. The light source unit 21 may include a mercury lamp, a light-emitting diode (LED), a laser light source, or the like. The liquid crystal panel may be either a transmission type or a reflection type. In addition, a digital micromirror device (DMD) may also be employed.

Figure 3:
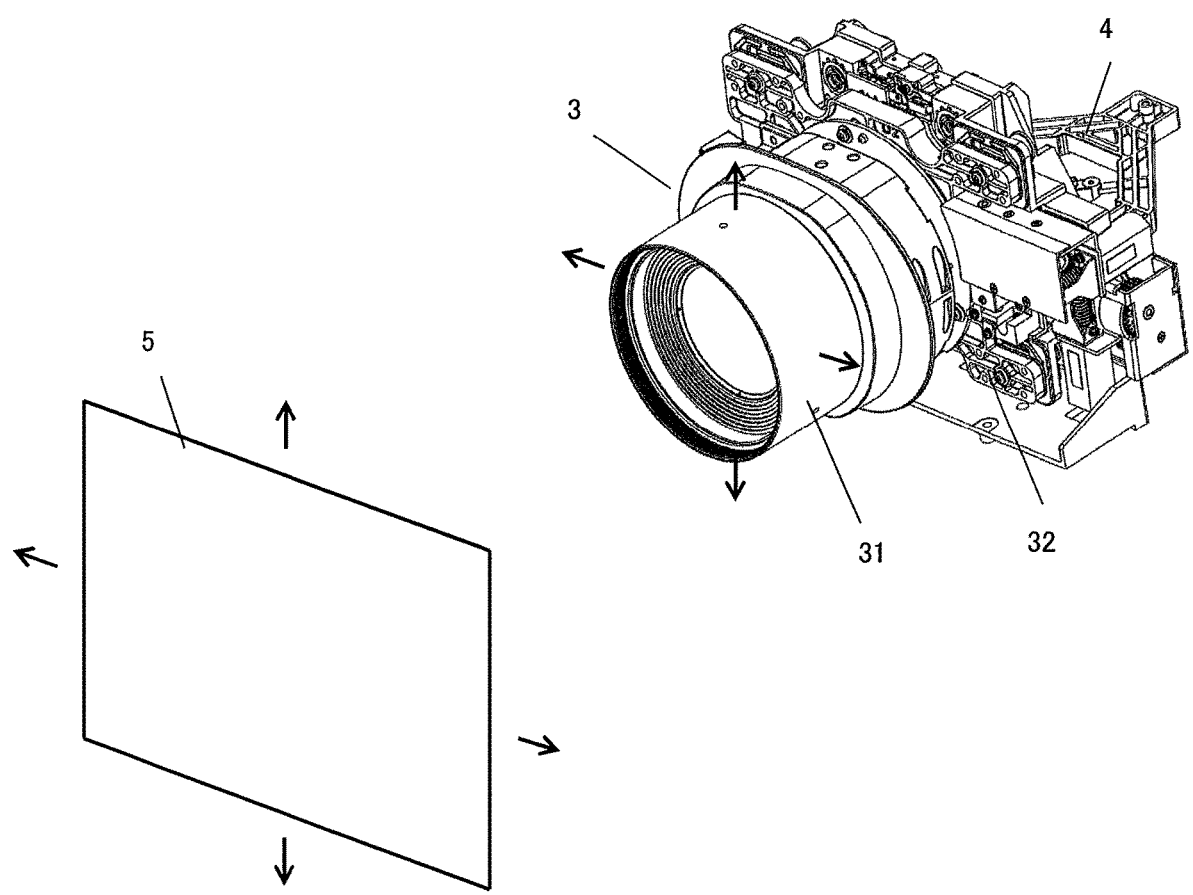
FIG. 3 is a diagram illustrating a whole configuration of a projection optical system 3 and a motion of a lens shift mechanism 32.

FIG. 3 is a diagram illustrating a whole configuration of the projection optical system 3 and a movement of the lens shift mechanism 32. The projection optical system 3 has a projection lens 31 and a lens shift mechanism 32, and the lens shift mechanism 32 is held in a common base 4. Note that an optical engine 2 is mounted in rear of the common base 4. The imaging light emitted from the color synthesis optical system 23 of the optical engine 2 is magnified and projected onto a screen 5 by the projection lens 31. The lens shift mechanism 32 retains the projection lens 31 and shifts the projection lens 31 in two axial directions perpendicular to an optical axis of the projection light, that is, horizontal and vertical directions. As a result, an image position projected onto the screen 5 can be adjusted by moving it in horizontal and vertical directions.

Figure 4A:
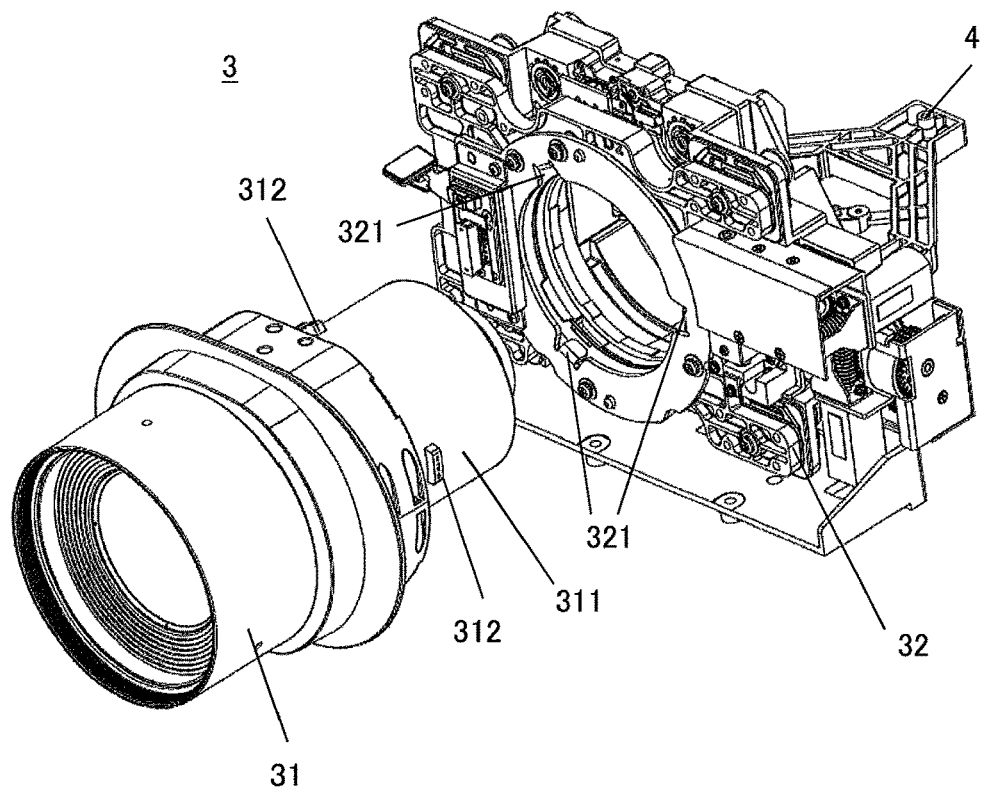
FIG. 4A is an exploded view illustrating the projection optical system 3.
Figure 4B:
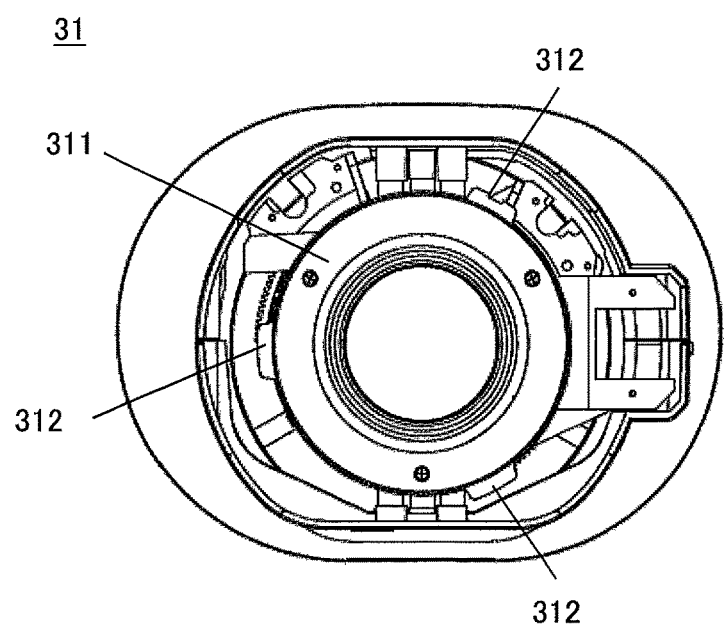
FIG. 4B is an exploded view illustrating the projection optical system 3.

FIGS. 4A and 4B are exploded views illustrating the projection optical system 3 separated into the projection lens 31 and the lens shift mechanism 32. As illustrated in FIG. 4A, a lens barrel 311 of the projection lens 31 has a flange (protrusion) 312. As this flange 312 is engaged with a concave portion 321 provided in the lens shift mechanism 32, the projection lens 31 is installed in the lens shift mechanism 32. FIG. 4B is a rear view illustrating the projection lens 31 in which, for example, three flanges 312 are provided around the lens barrel 311. Similarly, the lens shift mechanism 32 is also provided with three concave portions 321.

Figure 5:
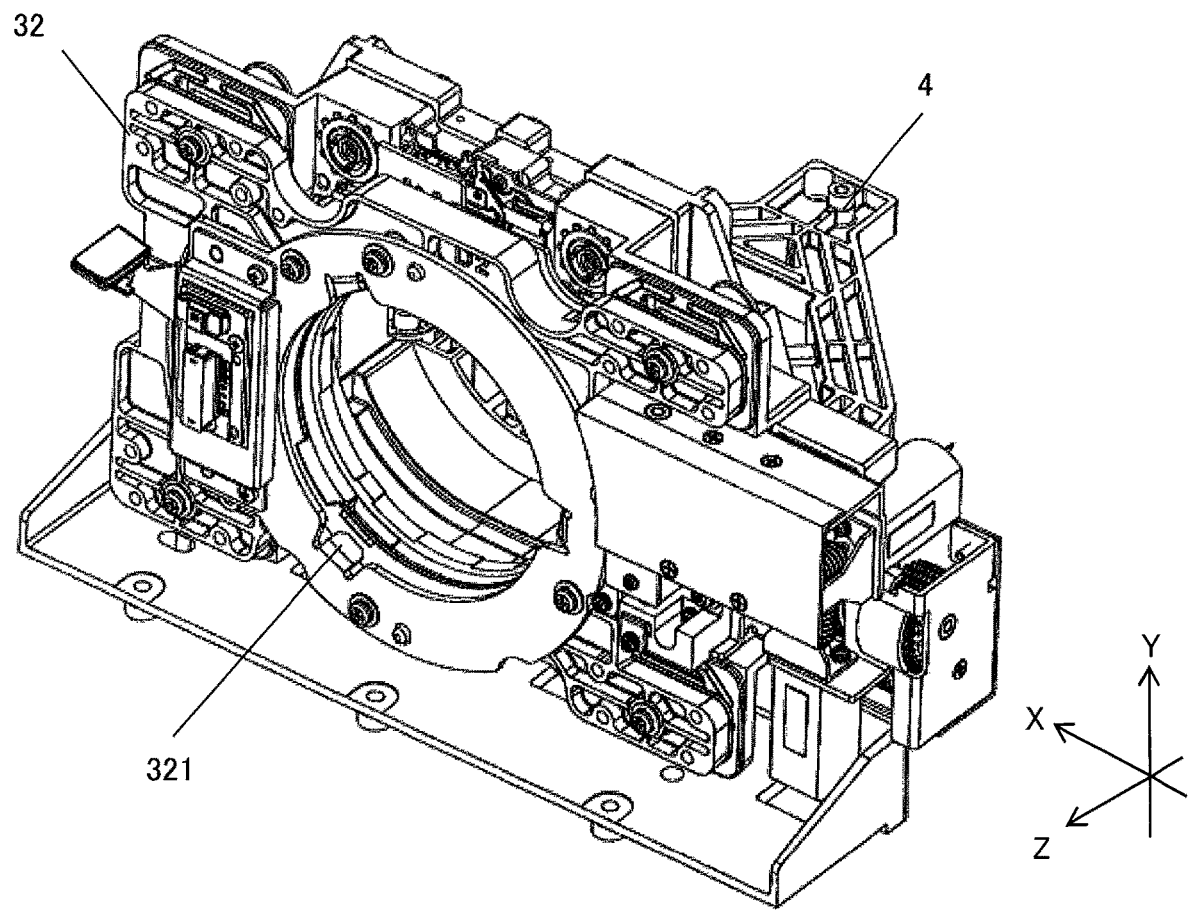
FIG. 5 is a perspective view illustrating the lens shift mechanism 32 and a common base 4.

FIG. 5 is a perspective view illustrating the lens shift mechanism 32 and the common base 4. FIG. 6 is an exploded view illustrating the lens shift mechanism 32 and the common base 4. In the following description, an optical axis direction of the projection light is defined as a Z-direction, and a horizontal direction and a vertical direction perpendicular to the Z-direction are defined as an X-direction and a Y-direction, respectively.

The common base 4 has a fixation wall 41 erected on the center and arm portions 42 and 43 extending from both sides of the fixation wall 41. The lens shift mechanism 32 is mounted on the front arm portion 43 and is fixed to the fixation wall 41. Note that the optical engine 2 is mounted on the rear arm portion 42. In order to install the lens shift mechanism 32 in the fixation wall 41, lens position correction screws 411a to 411d, springs 412a to 412d, and installation screws 413 are employed. These components are employed to correct a deviation of the lens position in the optical axis direction generated by a building tolerance after installation of the lens shift mechanism by appropriately adjusting a distance (back focal distance) from the liquid crystal panel surface of the optical engine 2 to the rear end of the projection lens.

In the assembly work of the lens shift mechanism 32, four lens position correction screws 411a to 411d are inserted from the back side, and four installation screws 413 are inserted from the front side, so that the projection lens 31 is engaged with the fixation wall 41 by interposing the springs 412a to 412d. A position of the lens shift mechanism 32, that is, a position of the projection lens 31 retained by the lens shift mechanism 32 can be corrected by adjusting the insertion amounts of the lens position correction screws 411a to 411d. In addition, since the lens shift mechanism 32 is supported by virtue of repulsive forces of the springs 412a to 412d, a lens collapse caused by a weight of the projection lens 31 is prevented.

Figure 7:
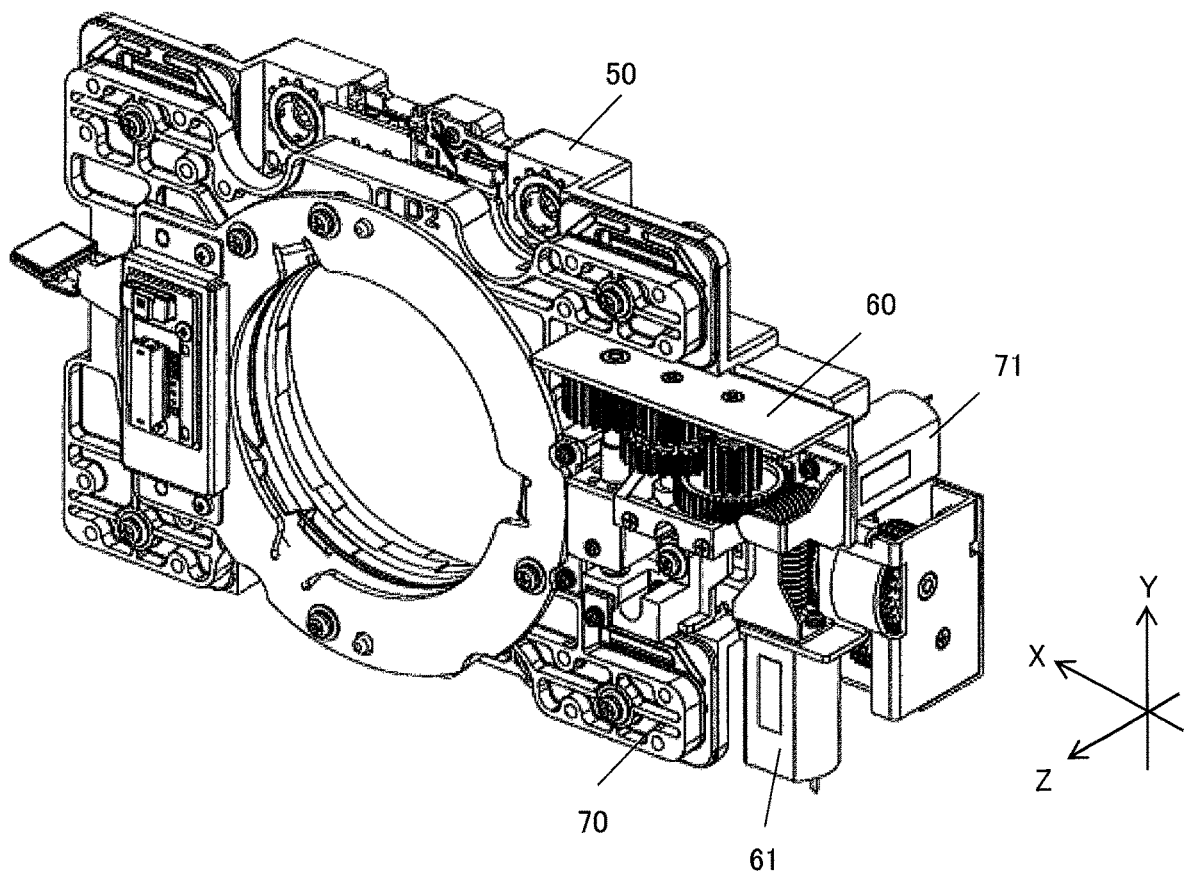
FIG. 7 is a perspective view illustrating the lens shift mechanism 32.
Figure 8A:
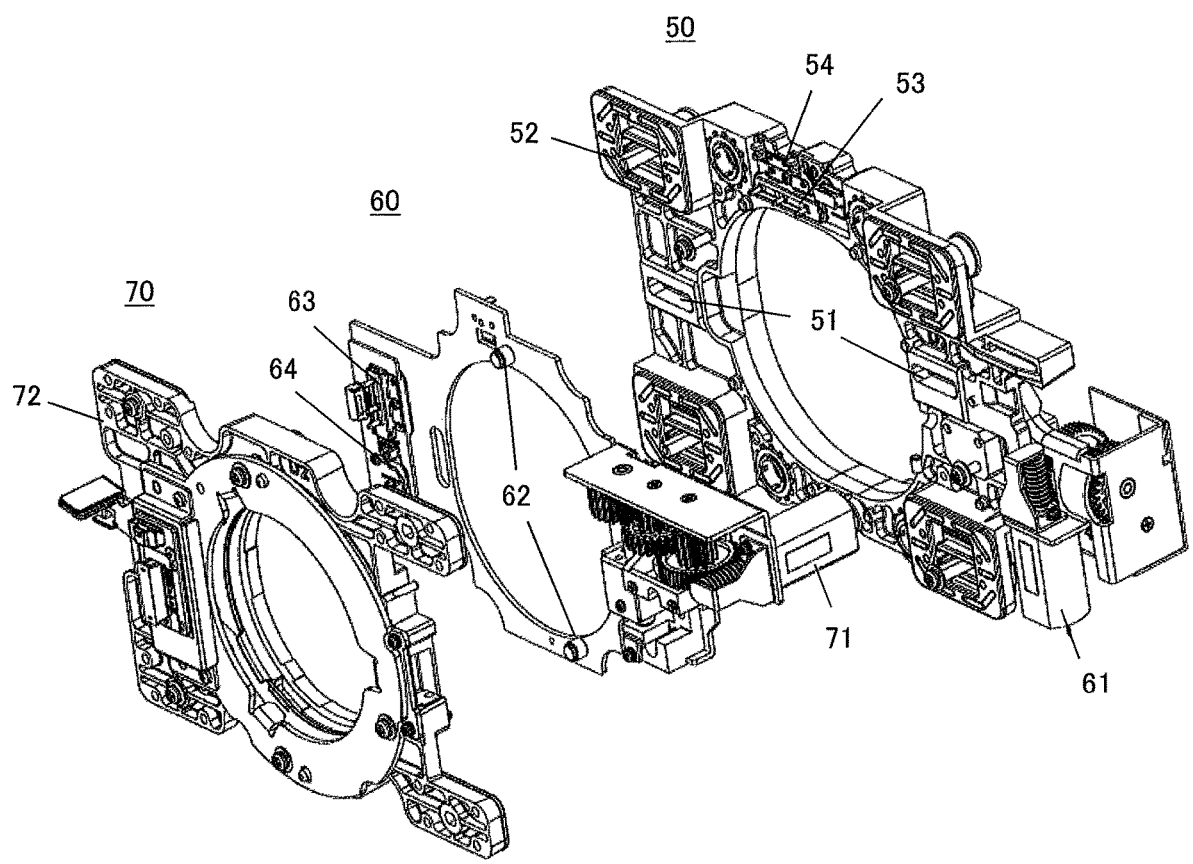
FIG. 8A is an exploded view illustrating the lens shift mechanism 32.

FIG. 7 is a perspective view illustrating the lens shift mechanism 32, and FIG. 8A is an exploded view illustrating the lens shift mechanism 32. The lens shift mechanism 32 is structured by assembling a fixation base 50 installed in the common base 4, an X-axis movable base 60 (hereinafter, simply referred to as an "X-base") that moves in the X-direction, and a Y-axis movable base 70 (hereinafter, simply referred to as a "Y-base") that holds the projection lens 31 and moves in the Y-direction. The X-base 60 moves in the X-direction along the fixation base 50 by a horizontal drive actuator 61 (hereinafter, referred to as an "X-axis actuator") installed in the fixation base 50. The Y-base 70 moves in the Y-direction along the X-base 60 by a vertical drive actuator 71 (hereinafter, referred to as a "Y-axis actuator") installed in the X-base. These components serve as a mechanism for interposing the X-base 60 between the fixation base 50 and the Y-base 70.

In a case of driving in the X-axis direction, a guide pin provided in the X-base 60 moves along a guide pin receptacle 51 provided in the fixation base 50. Similarly, in the case of driving in the Y-axis direction, a guide pin 62 provided in the X-base 60 moves along a guide pin receptacle of the Y-base 70. In addition, in order to reduce a frictional force caused by surface sliding between the fixation base 50 and the Y-base 70, components having a small coefficient of friction (such as shift sliding bases 52 and 72) are installed in the fixation base 50 and the Y-base 70, and a lubricant is applied to reduce a frictional resistance.

In order to prevent the applied lubricant from being leaking from the shift sliding bases 52 and 72 by surface sliding, a groove for reserving the lubricant is provided in the shift sliding bases 52 and 72. The fixation base 50 is provided with a potentiometer 53 for detecting a position of the X-base 60 and an end sensor 54 for detecting a movement end point. Similarly, the X-base 60 is provided with a potentiometer 63 for detecting a position of the Y-base 70 and an end sensor 64.

Figure 8B:
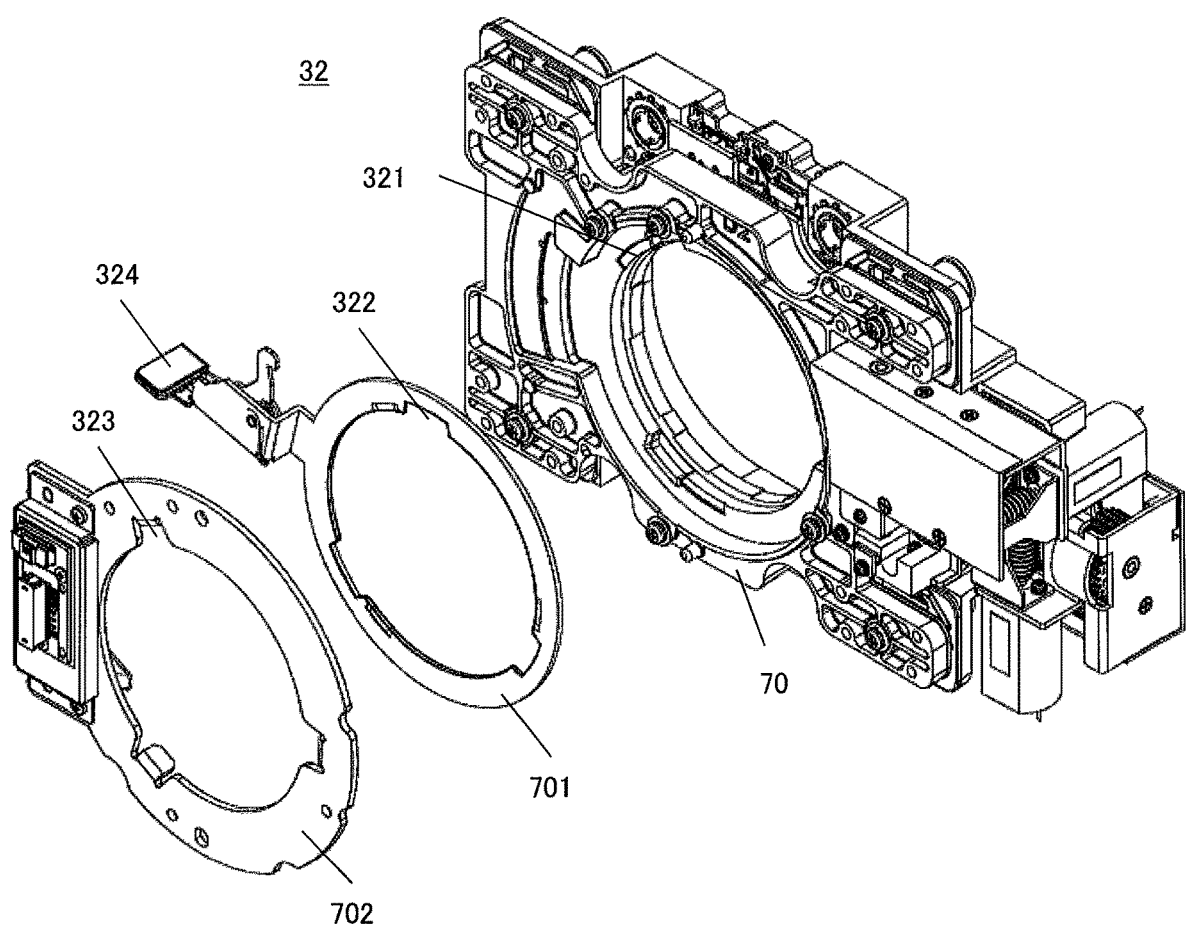
FIG. 8B is an exploded view further illustrating a Y-base 70.

FIG. 8B is an exploded view illustrating the Y-base 70. A method of installing/uninstalling the projection lens 31 will be described with reference to FIG. 8B. The Y-base 70 is divided into a lens retaining ring 701 and a lens retaining holder 702 for retaining the projection lens 31. In order to retain the projection lens 31, (three) concave portions 321 are provided in the Y-base 70 and are engaged with flanges 312 (refer to FIG. 4B) provided in the lens barrel 311 of the projection lens 31. The concave portion 321 has a depth slightly smaller than a Z-directional width of the flange 312. Each of the lens retaining ring 701 and the lens retaining holder 702 is provided with (three) notches 322 and 323 to allow the flanges 312 to pass during installation/uninstallation.

The lens retaining ring 701 is provided with a lever 324 for switching between locking and unlocking states of the lens. When the projection lens 31 is installed, the lens retaining ring 701 is rotated using the lever 324 so as to align the concave portions 321 and the notches 322 and engage the flanges 312 with the concave portions 321. In addition, the projection lens 31 is fixed to the Y-base 70 by rotating the lever 324 again to press the projection lens 31 with the lens retaining ring 701. When the projection lens 31 is removed, the lens retaining ring 701 is reversely rotated using the lever 324 so as to align the concave portions 321 and the notches 322 of the lens retaining ring 701 again. Then, the projection lens 31 can be removed.

Figure 9:
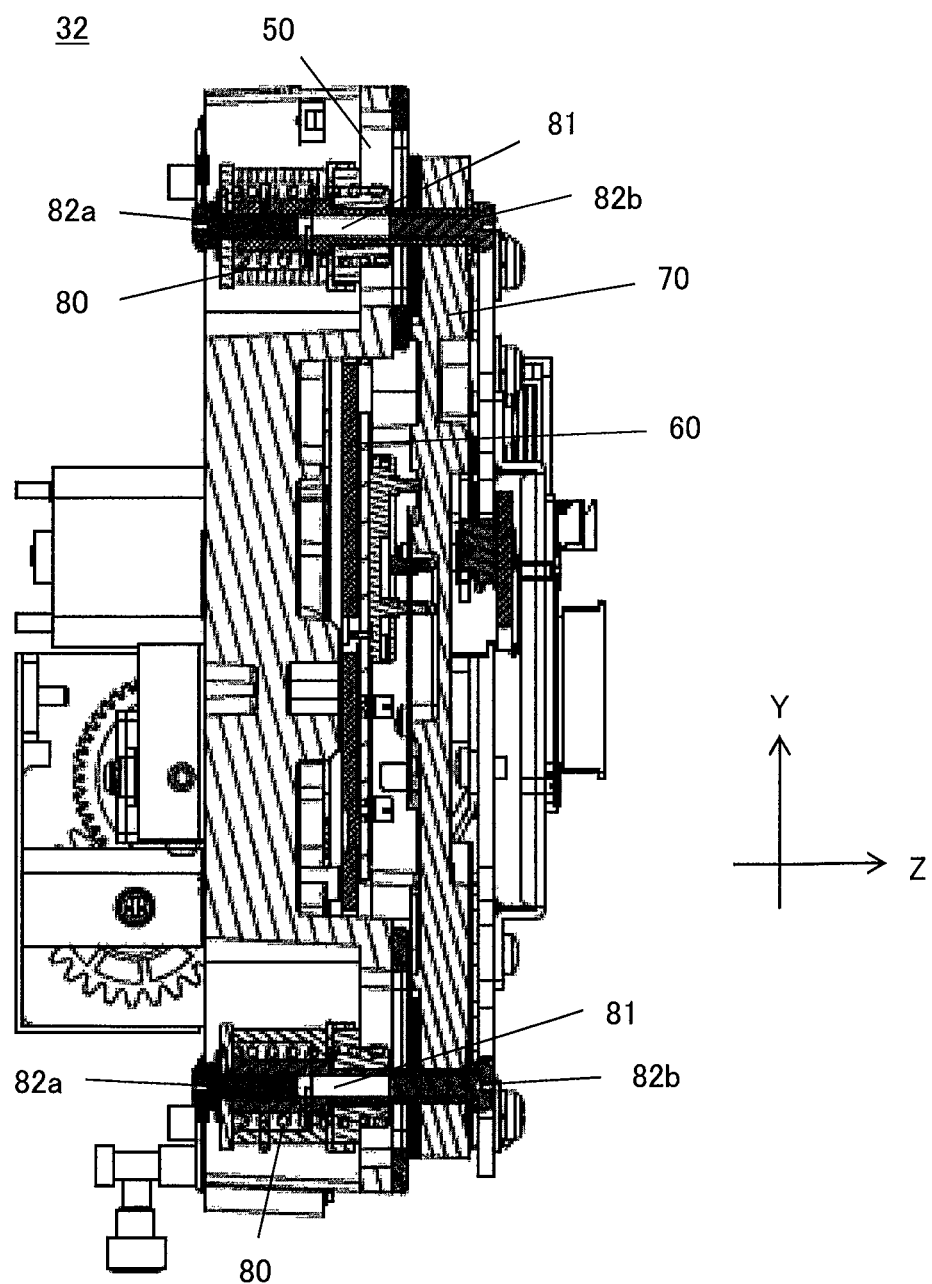
FIG. 9 is an erection diagram illustrating the lens shift mechanism 32.

FIG. 9 is an erection diagram illustrating the lens shift mechanism 32. For installation, a shaft 81 is inserted through the fixation base 50 and the Y-base 70 by interposing the X-base 60. Engagement screws 82a are installed in the fixation base 50 side of the shaft 81 by interposing retaining springs 80, and engagement screws 82b are inserted from the Y-base 70 side of the shaft 81. The fixation base 50, the X-base 60, and the Y-base 70 are pressedly engaged by virtue of repulsive forces of the engagement screws 82a and 82b and the retaining springs 80 in both sides. In this case, a frictional resistance caused by surface sliding can be adjusted by controlling the repulsive forces of the retaining springs 80. Therefore, it is possible to optimize a lens retaining force and a lens shift movability.

FIG. 10 illustrates a horizontal drive mechanism (for power transmission in the X-axis direction), and FIG. 11 illustrates a vertical drive mechanism (for power transmission in the Y-axis direction). FIG. 10 is a rear view illustrating the lens shift mechanism 32, and FIG. 11 is a front view illustrating the lens shift mechanism 32.

In the horizontal drive mechanism of FIG. 10, a rotational force of the X-axis actuator 61 installed in the fixation base 50 is transmitted from a worm gear 65 to a drive unit 67 by reducing speed through a gear train 66 (worm wheels 66a to 66c). The drive unit 67 includes a lead screw 671 and a drive nut 672, so that a rotational force from the gear train 66 is transmitted to the lead screw 671 to propel a non-rotating drive nut 672 (hereinafter, referred to as a "lead nut") meshing with the lead screw 671. The X-base 60 is connected to the lead nut 672 so that the X-base 60 is shifted in the X-axis direction.

Similarly, in the vertical drive mechanism of FIG. 11, a rotational force of the Y-axis actuator 71 installed in the X-base 60 is transmitted from a worm gear 73 to a drive unit 75 by reducing speed through a gear train 74 (worm wheels 74a to 74c). The drive unit 75 includes a lead screw 751 and a drive nut 752, so that a rotational force from the gear train 74 is transmitted to the lead screw 751 to propel a non-rotating drive nut 752 (hereinafter, referred to as a "lead nut") meshing with the lead screw 751. The Y-base 70 is connected to the lead nut 752 so that the X-base 70 is shifted in the Y-axis direction.

In order to improve assemblability, the X-axis actuator 61, the worm gear 65, the gear train 66, and the drive unit 67 may be integrated into a single module in advance. In this case, the horizontal drive mechanism is completed just by installing this module in the fixation base 50. This similarly applies to the vertical drive mechanism.

FIG. 12 illustrates an internal structure of the horizontal drive lead nut, and FIG. 13 illustrates an internal structure of the vertical drive lead nut. In both FIGS. 12 and 13, the diagram (a) illustrates an assembled state, and the diagram (b) illustrates a disassembled state. In horizontal driving, the lead screw 671 coaxial with the worm wheel 66c is rotated, so that the lead nut 672 meshing with the lead screw 671 propels the X-base 60. In vertical driving, the lead screw 751 coaxial with the worm wheel 74c is rotated, so that the lead nut 752 meshing with the lead screw 751 propels the Y-base 70.

An internal structure of the horizontal drive lead nut of FIG. 12 has a double nut structure in which a subsidiary lead nut 672b (hereinafter, referred to as a "subsidiary nut") is arranged in addition to the lead nut 672 to face each other, and a waved washer 672c as an elastic body is interposed therebetween. As the subsidiary nut 672b, for example, a polygonal nut such as a dodecagonal shape is employed. In the double nut structure, it is possible to reduce a backlash generated when the lead screw 671 drives the lead nut 672 and adjust a gap between the lead screw 671 and the lead nut 672 and a frictional force by virtue of a pressure from the waved washer 672c. Therefore, it is possible to adjust a backlash amount.

Similarly, the internal structure of the vertical drive lead nut of FIG. 13 has a double nut structure in which a subsidiary nut 752b is arranged in addition to the lead nut 752 to face each other, and a waved washer 752c is interposed therebetween. In the double nut structure, it is possible to reduce a backlash generated by driving the lead nut 752 using the lead screw 751 and adjust a gap between the lead screw 751 and the lead nut 752 and a frictional force by virtue of a pressure from the waved washer 752c. Therefore, it is possible to adjust a backlash amount.

An assembly work of the lead nuts 672 and 752 will be described with reference to FIGS. 12 and 13. The subsidiary nuts 672b and 752b are fixed to the lead nuts 672 and 752, for example, using C-shaped nut fixtures 672a and 752a and fixing screws 672d and 752d. The widths of the nut fixtures 672a and 752a and the diameters of the subsidiary nuts 672b and 752b are set to be equal.

In the horizontal drive lead nut of FIG. 12, for example, a pair of screw holes are bored on the axial surface of the subsidiary nut 672b, and, for example, six holes are bored at an equal angle on the surface facing the nut fixture 672a. In addition, one hole is bored on both side surfaces of the lead nut 672, and one hole is bored on the facing surface of the nut fixture 672a. Furthermore, a pressure generated by the waved washer 672c is applied to the lead nut 672 and the subsidiary nut 672b to adjust the gap. Then, the subsidiary nut 672b is fixed to the nut fixture 672a using the axial fixing screw 672d, and the nut fixture 672a is fixed to the lead nut 672 with the side fixing screw 672d. In this example, three fixing screws are used for fixation. As a result, the interval between the lead nut 672 and the subsidiary nut 672b is fixed, and rotation of the subsidiary nut 672b against the lead nut 672 is locked in a non-rotating state.

Note that a stride of the gap between the subsidiary nut 672b and the lead nut 672 can be changed by increasing or decreasing the number of holes on the axial surface of the nut fixture 672a. The gap between the subsidiary nut 672b and the lead nut 672 is adjusted using a rotational torque of the lead screw 671 to optimize the backlash amount and the frictional force. After the adjustment, the lead nut 672, the subsidiary nut 672b, and the waved washer 672c are fixed using the nut fixture 672a to integrate them into a single drive unit 67. Therefore, it is possible to improve assemblability. The assembly work of the vertical drive lead nut in FIG. 13 is similar, and it will not be described.

Figure 14:
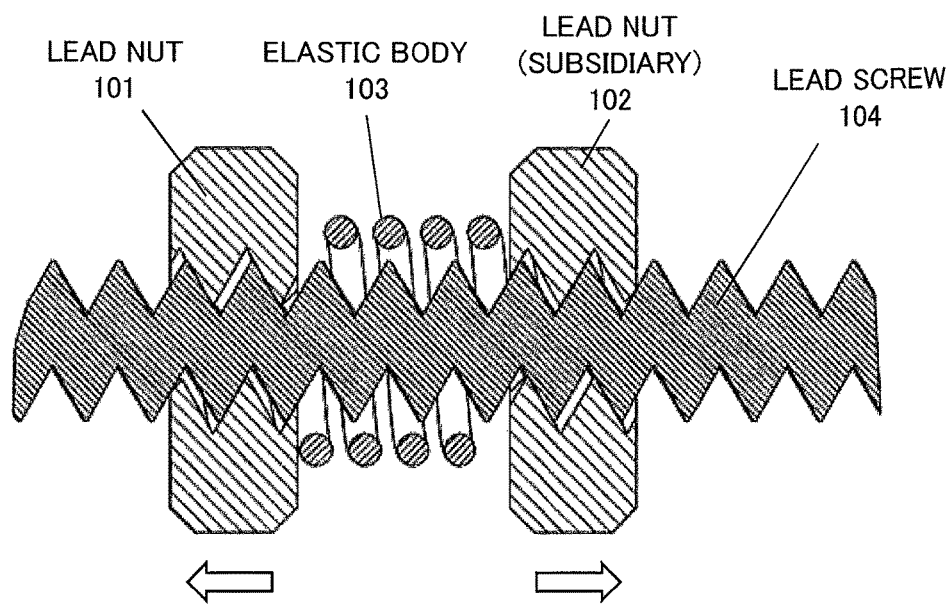
FIG. 14 is an explanatory diagram for describing backlash reduction using a double nut structure.

FIG. 14 is an explanatory diagram for describing backlash reduction using the double nut structure. A pair of lead nuts 101 and 102 are installed in the lead screw 104 by interposing an elastic body 103 such as a waved washer or a spring. If the subsidiary lead nut 102 is rotated to approach the lead nut 101 side, the elastic body 103 is compressed, and the pressure is applied such that a pair of lead nuts 101 and 102 recede from each other in the axial direction. As a result, flanks of the threads on the lead nuts 101 and 102 are pressed by flanks of the threads on the lead screw 104, and the pressed flanks are opposite to each other between the lead nuts 101 and 102. Therefore, even when a movement direction is reversed by reversely rotating the lead screw 104, the threads of the lead screw 104 make contact with the treads of the lead nuts 101 and 102 at all times. Therefore, a backlash is reduced. In addition, the repulsive force (pressure) of the elastic body 103 can be adjusted by changing a gap between a pair of lead nuts 101 and 102, so as to optimize the backlash amount and the frictional force.

A modification of the double nut structure will now be described.

Figure 15:
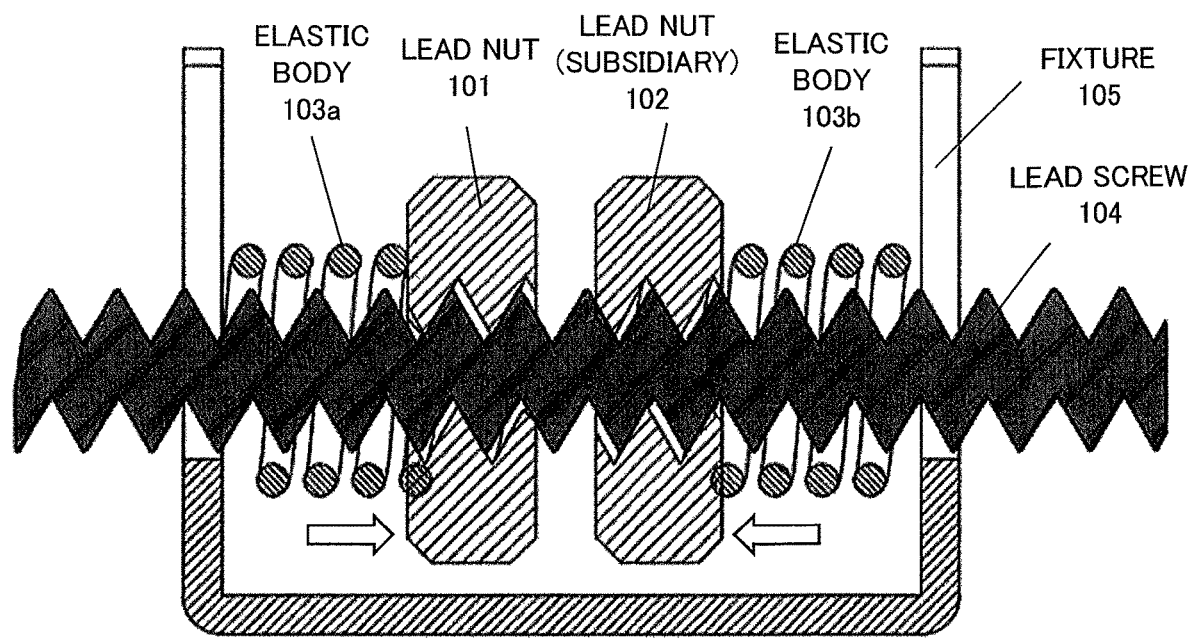
FIG. 15 is a diagram illustrating another configuration example of the double nut structure.

FIG. 15 is a diagram illustrating another configuration example of the double nut structure. Pressures are applied from a pair of elastic bodies 103a and 103b provided in the outer sides toward a pair of lead nuts 101 and 102 installed in the lead screw 104 in an axial direction such that the lead nuts 101 and 102 approach each other. A pair of elastic bodies 103a and 103b are fixed to the fixture 105 from the respective outer sides. Similarly, in this case, the threads of the lead nuts 101 and 102 are pressed by the threads of the lead screw 104, so that the pressed flanks are opposite to each other between the lead nuts 101 and 102. Therefore, it is possible to reduce a backlash when the movement direction is reversed. Note that one of the elastic bodies, for example, the elastic body 103a may be omitted to directly fix the lead nut 101 to the fixture 105.

FIG. 16 is a diagram illustrating a specific shape of the subsidiary nut. The drawing (a) of FIG. 16 illustrates a dodecagonal nut 110 as an example of the polygonal nut. The fixing screws 672d and 752d of FIGS. 12 and 13 are inserted into the screw holes 111. In this case, any one of the twelve outer circumferential surfaces of the dodecagonal nut 110 can be fixed on a surface for holding the fixture 105. It is possible to position to set twelve stride positions per a single turn.

The drawing (b) of FIG. 16 illustrates an exemplary gear-like nut 112 finely toothed (knurling) on its outer circumference. In this case, since the toothed portion can be modified, an arbitrary position of the outer circumference can be fixed on the holding surface of the fixture 105. Note that, in this case, since the holding force of the gear-like nut 112 caused by the fixture 105 can be sufficiently large, it is possible to omit the screw holes 111 of the fixing screws in the drawing (a) of FIG. 16.

In this manner, in the first embodiment, a double nut structure is employed in the horizontal drive lead nut 672 and the vertical drive lead nut 752 of the lens shift mechanism 32. Therefore, it is possible to reduce a backlash generated by reversing the lens shift direction and remove a delay in the lens shift movement.

Second Embodiment

In the second embodiment, a lens shift mechanism capable of easily correcting an optical axis tilt of the projection lens will be described. As described above in conjunction with FIG. 6, initial correction for the position of the projection lens 31 and a collapse of the lens caused by its weight may be performed by adjusting the insertion amounts of the four lens position correction screws 411a to 411d. However, if the projection lens 31 is replaced with a heavier lens, its optical axis may be tilted by a weight of the lens. Therefore, it is necessary to perform correction again. In the method of adjusting the lens using the four lens position correction screws 411a to 411d, the adjustment work becomes complicated. In this regard, a mechanism for simply correcting the optical axis tilt may be added as described below.

Figure 17:
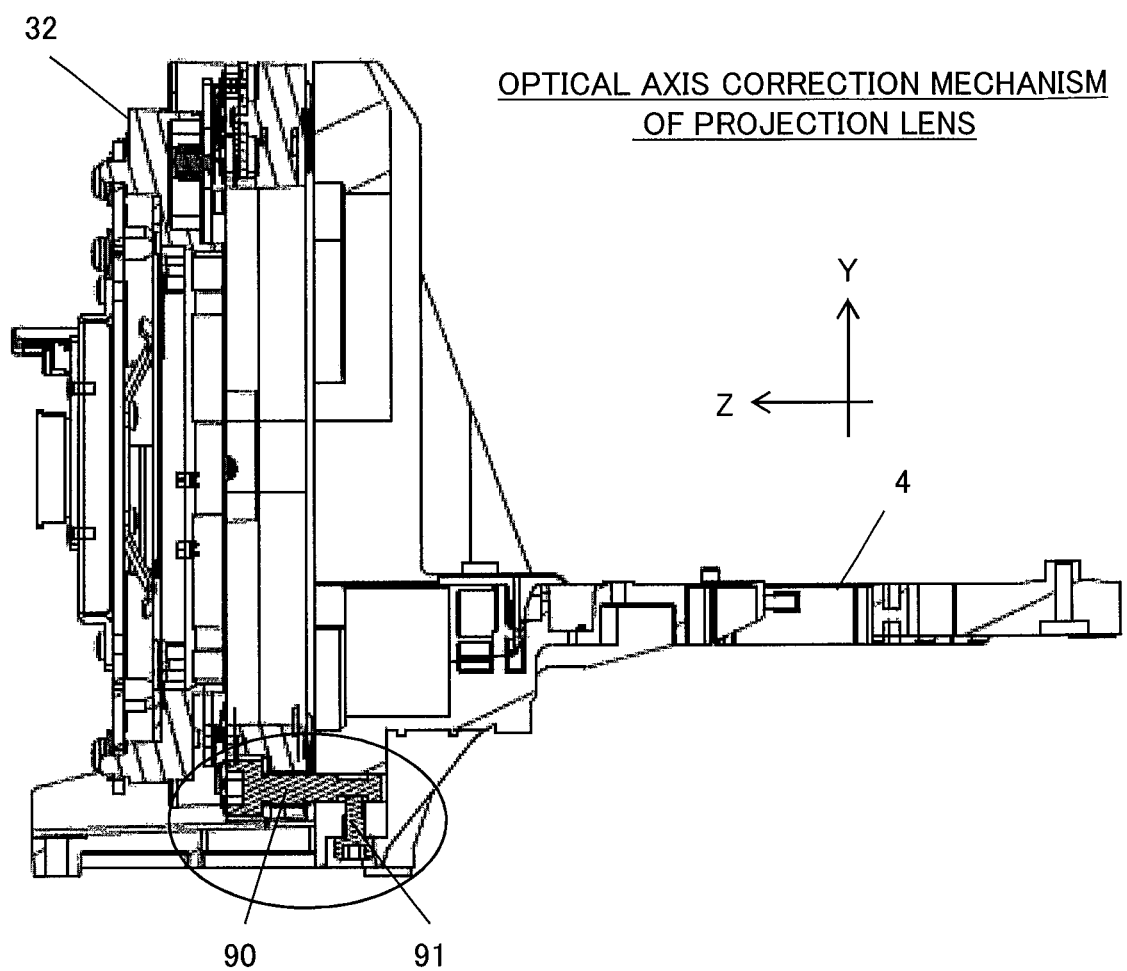
FIG. 17 is a cross-sectional view illustrating an optical axis correction mechanism of a projection lens.

FIG. 17 is a cross-sectional view illustrating an optical axis correction mechanism of a projection lens. In this embodiment, correction is performed for a collapse of the lens shift mechanism 32 when a heavy lens is mounted. When the lens shift mechanism 32 is mounted on the common base 4, it is installed in the common base 4 using an optical axis adjustment guide 90 provided in the lower part of the lens shift mechanism 32. That is, a concave portion is provided in the vicinity of the tip of the threaded portion of the optical axis adjustment guide 90, and the fixing screw 91 inserted from the lower part of the common base 4 is engaged with the concave portion. In addition, just by adjusting the insertion amount of the optical axis adjustment guide 90, the fixing screw 91 and the concave portion of the optical axis adjustment guide 90 are engaged with each other, and optical axis correction is performed by tilting the lens shift mechanism 32.

FIG. 18 is a diagram illustrating exemplary projection lens optical axis correction. The drawing (a) of FIG. 18 illustrates a state in which the lens shift mechanism 32 is collapsed to the front side by a weight of the projection lens 31, and its optical axis is tilted downward relative to the horizontal direction. The drawing (b) of FIG. 18 illustrates a state after the optical axis correction. In this correction, by pushing the optical axis adjustment guide 90 into the fixation wall 41 side, the lower part of the lens shift mechanism 32 can be separated from the fixation wall 41, and the optical axis can be returned to the horizontal direction.

In this manner, in the second embodiment, the optical axis tilt correction can be easily performed just by pushing or returning the optical axis adjustment guide 90.

In the embodiments described above, it is possible to reduce a backlash in the lens shift mechanism and facilitate optical axis tilt correction when the projection lens replacement. Therefore, it is possible to improve user's operability.

REFERENCE SIGNS LIST

1 . . . housing
2 . . . optical engine
3 . . . projection optical system
4 . . . common base
5 . . . screen
10 . . . projection-type image display device
31 . . . projection lens
32 . . . lens shift mechanism
41 . . . fixation wall
42, 43 . . . arm portion
50 . . . fixation base
60 . . . X-axis movable base
61 . . . X-axis actuator
65, 73 . . . worm gear
66, 75 . . . gear train
66a to 66c, 74a to 74c . . . worm wheels
67, 75 . . . drive unit
70 . . . Y-axis movable base
71 . . . Y-axis actuator
80 . . . retaining spring
81 . . . shaft
82a . . . engagement screw
90 . . . optical axis adjustment guide
91 . . . fixing screw
101 . . . lead nut
102, 110, 112 . . . subsidiary lead nut
103 . . . elastic body
105 . . . fixture
311 . . . lens barrel
312 . . . flange
411a to 411d . . . lens position correction screw
412a to 412d . . . spring
413 . . . installation screw
671, 751 . . . lead screw
672, 752 . . . lead nut
672a, 752a . . . nut fixture
672b, 752b . . . subsidiary lead nut
672c, 752c . . . elastic body (waved washer)
672d, 752d . . . fixing screw

The invention claimed is:

1. A projection-type image display device that projects an image from a projection lens, comprising a lens shift mechanism configured to retain the projection lens and shift the projection lens in two directions perpendicular to an optical axis of projection light,
wherein the lens shift mechanism has a horizontal movable base for horizontally shifting the projection lens, a vertical movable base for vertically shifting the projection lens, a horizontal drive actuator for driving the horizontal movable base, and a vertical drive actuator for driving the vertical movable base,
a horizontal driving force of the horizontal drive actuator is transmitted via a first lead screw and a first pair of lead nuts meshing with the first lead screw to shift the horizontal movable base,
a vertical driving force of the vertical drive actuator is transmitted via a second lead screw and a second pair of lead nuts meshing with the second lead screw to shift the vertical movable base,
an elastic body applies a pressure to the first pair of lead nuts such that the first pair of lead nuts recede from each other in an axial direction of the first lead screw in order to reduce a backlash generated when the first lead screw drives the first pair of lead nuts to shift the horizontal movable base,
wherein the elastic body is interposed between the first pair of lead nuts and the elastic body applies the pressure to the first pair of lead nuts such that the first pair of lead nuts recede from each other in the axial direction of the first lead screw.

2. The projection-type image display device according to claim 1,
wherein an optical axis adjustment guide is inserted into a common base that holds the lens shift mechanism from the lens shift mechanism side,
the optical axis adjustment guide has a concave portion in the vicinity of a tip of a threaded portion and a fixing screw inserted from the common base side is engaged with the concave portion, and
an optical axis tilt of the projection lens retained in the lens shift mechanism is corrected by adjusting an insertion amount of the optical axis adjustment guide.

3. The projection-type image display device according to claim 1,
wherein a nut fixture fixes an interval between the first pair of lead nuts to apply a predetermined pressure to the elastic body.

4. The projection-type image display device according to claim 1,
wherein one of the first pair of lead nuts is a polygonal nut having a polygonal outer circumference.

5. The projection-type image display device according to claim 1,
wherein the elastic body is a waved washer.

6. A projection-type image display device that projects an image from a projection lens, comprising a lens shift mechanism configured to retain the projection lens and shift the projection lens in two directions perpendicular to an optical axis of projection light,
wherein the lens shift mechanism has a horizontal movable base for horizontally shifting the projection lens, a vertical movable base for vertically shifting the projection lens, a horizontal drive actuator for driving the horizontal movable base, and a vertical drive actuator for driving the vertical movable base,
a horizontal driving force of the horizontal drive actuator is transmitted via a first lead screw and a first pair of lead nuts meshing with the first lead screw to shift the horizontal movable base,
a vertical driving force of the vertical drive actuator is transmitted via a second lead screw and a second pair of lead nuts meshing with the second lead screw to shift the vertical movable base, and
an elastic body applies a pressure to the second pair of lead nuts such that the second pair of lead nuts recede from each other in an axial direction of the second lead screw in order to reduce a backlash generated when the second lead screw drives the second pair of lead nuts to shift the vertical movable base, wherein the elastic body is interposed between the second pair of lead nuts and the elastic body applies the pressure to the second pair of lead nuts such that the second pair of lead nuts recede from each other in the axial direction of the second lead screw.

7. The projection-type image display device according to claim 6, wherein an optical axis adjustment guide is inserted into a common base that holds the lens shift mechanism from the lens shift mechanism side, the optical axis adjustment guide has a concave portion in the vicinity of a tip of a threaded portion and a fixing screw inserted from the common base side is engaged with the concave portion, and an optical axis tilt of the projection lens retained in the lens shift mechanism is corrected by adjusting an insertion amount of the optical axis adjustment guide.

8. The projection-type image display device according to claim 6, wherein a nut fixture fixes an interval between the second pair of lead nuts to apply a predetermined pressure to the elastic body.

9. The projection-type image display device according to claim 6, wherein one of the second pair of lead nuts is a polygonal nut having a polygonal outer circumference.

10. The projection-type image display device according to claim 6, wherein the elastic body is a waved washer.

11. A projection-type image display device that projects an image from a projection lens, comprising a lens shift mechanism configured to retain the projection lens and shift the projection lens in two directions perpendicular to an optical axis of projection light, wherein the lens shift mechanism has a horizontal movable base for horizontally shifting the projection lens, a vertical movable base for vertically shifting the projection lens, a horizontal drive actuator for driving the horizontal movable base, and a vertical drive actuator for driving the vertical movable base, a horizontal driving force of the horizontal drive actuator is transmitted via a first lead screw and a first pair of lead nuts meshing with the first lead screw to shift the horizontal movable base, a vertical driving force of the vertical drive actuator is transmitted via a second lead screw and a second pair of lead nuts meshing with the second lead screw to shift the vertical movable base, an elastic body applies a pressure to the first pair of lead nuts such that the first pair of lead nuts approach each other in an axial direction of the first lead screw in order to reduce a backlash generated when the first lead screw drives the first pair of lead nuts to shift the horizontal movable base, wherein the elastic body is disposed on outer sides of the first pair of lead nuts and the elastic body applies the pressure to the first pair of lead nuts such that the first pair of lead nuts approach each other in the axial direction of the first lead screw.

12. The projection-type image display device according to claim 11, wherein an optical axis adjustment guide is inserted into a common base that holds the lens shift mechanism from the lens shift mechanism side, the optical axis adjustment guide has a concave portion in the vicinity of a tip of a threaded portion and a fixing screw inserted from the common base side is engaged with the concave portion, and an optical axis tilt of the projection lens retained in the lens shift mechanism is corrected by adjusting an insertion amount of the optical axis adjustment guide.

13. The projection-type image display device according to claim 11, wherein a nut fixture fixes an interval between the first pair of lead nuts to apply a predetermined pressure to the elastic body.

14. The projection-type image display device according to claim 11, wherein one of the first pair of lead nuts is a polygonal nut having a polygonal outer circumference.

15. The projection-type image display device according to claim 11, wherein the elastic body is a pair of springs.

16. A projection-type image display device that projects an image from a projection lens, comprising a lens shift mechanism configured to retain the projection lens and shift the projection lens in two directions perpendicular to an optical axis of projection light, wherein the lens shift mechanism has a horizontal movable base for horizontally shifting the projection lens, a vertical movable base for vertically shifting the projection lens, a horizontal drive actuator for driving the horizontal movable base, and a vertical drive actuator for driving the vertical movable base, a horizontal driving force of the horizontal drive actuator is transmitted via a first lead screw and a first pair of lead nuts meshing with the first lead screw to shift the horizontal movable base, a vertical driving force of the vertical drive actuator is transmitted via a second lead screw and a second pair of lead nuts meshing with the second lead screw to shift the vertical movable base, an elastic body applies a pressure to the second pair of lead nuts such that the second pair of lead nuts approach each other in an axial direction of the second lead screw in order to reduce a backlash generated when the second lead screw drives the second pair of lead nuts to shift the vertical movable base, wherein the elastic body is disposed on outer sides of the second pair of lead nuts and the elastic body applies the pressure to the second pair of lead nuts such that the second pair of lead nuts approach each other in the axial direction of the second lead screw.

17. The projection-type image display device according to claim 16, wherein an optical axis adjustment guide is inserted into a common base that holds the lens shift mechanism from the lens shift mechanism side, the optical axis adjustment guide has a concave portion in the vicinity of a tip of a threaded portion and a fixing screw inserted from the common base side is engaged with the concave portion, and an optical axis tilt of the projection lens retained in the lens shift mechanism is corrected by adjusting an insertion amount of the optical axis adjustment guide.

18. The projection-type image display device according to claim 16, wherein a nut fixture fixes an interval between the second pair of lead nuts to apply a predetermined pressure to the elastic body.

19. The projection-type image display device according to claim 16,
   wherein one of the second pair of lead nuts is a polygonal nut having a polygonal outer circumference.

20. The projection-type image display device according to claim 16,
   wherein the elastic body is a pair of springs.

* * * * *